F. O. MATTHIESSEN.
Apparatus for Refining Sugar.

No. 163,094. Patented May 11, 1875.

WITNESSES:
Willard Farr
Edw.ᵃ Payson

INVENTOR:
F. O. Matthiessen
Per Edw. E. Quimby
Atty.

THE GRAPHIC CO.PHOTO-LITH.39 & 41 PARK PLACE,N.Y.

UNITED STATES PATENT OFFICE.

FRANZ O. MATTHIESSEN, OF NEW YORK, N. Y.

IMPROVEMENT IN APPARATUS FOR REFINING SUGAR.

Specification forming part of Letters Patent No. 163,094, dated May 11, 1875; application filed April 26, 1875.

*To all whom it may concern:*

Be it known that I, FRANZ O. MATTHIESSEN, of the city and State of New York, have invented certain Improvements in Apparatus for Refining Sugar, of which the following is a specification:

My improvements relate to apparatus for conducting my improved process of refining sugar, whereby the sugar-mass discharged from the vacuum-pan after the usual boiling is converted into coffee-sugar without leaving any fluid remainder in the form of sirup.

My invention consists in arranging in combination with a vacuum-pan an elevated vacuum-chamber, which is provided near the top with a minutely-perforated diaphragm, upon which the sugar-mass is discharged from the vacuum-pan, and from which it falls through the perforations in the diaphragm, and drops to the bottom of the vacuum-chamber in the form of spray. The bottom of the vacuum-chamber is removable for the purpose of taking out the sugar, but is capable of being hermetically applied, so that a more or less partial vacuum can be maintained in the chamber by means of a suitably-arranged exhaust-pipe. A pipe is also connected with the chamber a short distance above the bottom, which has two external branches, each provided with a stop-cock. The object of this pipe is twofold—first, to inject through one of the branches hot air into the chamber, when it is desired to subject the material operated upon to the direct action of hot air; and, secondly, by means of the other branch pipe, to inject cold air for the purpose of reducing the temperature of the chamber, if desired.

Figure 1:
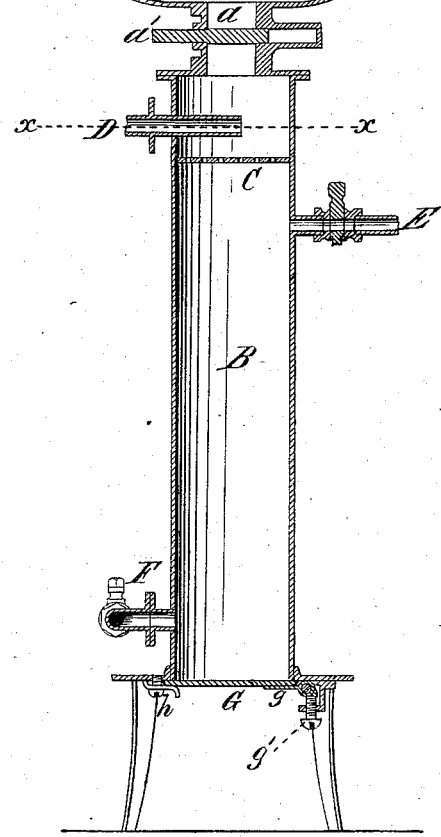
Figure 2:
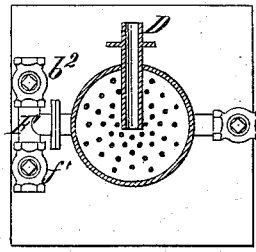
Figure 3:
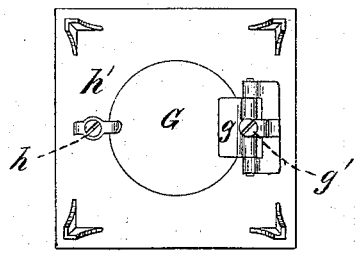

The accompanying drawings are as follows:

Figure 1 is a vertical section, showing the vacuum-pan arranged immediately over the vacuum-chamber, provided with the perforated diaphragm, the exhaust-pipe and injection-pipe, and the hermetically-applied bottom or man-hole. Fig. 2 is a horizontal section of the apparatus through the line $x\ x$ on Fig. 1, showing the injection-pipe, exhaust-pipe and branch pipe, and the top of the perforated diaphragm. Fig. 3 is a view of the under side of the chamber, showing the set-screws and clamp for securing the hinged plate which hermetically closes the bottom of the chamber.

Referring to the drawings, A represents a vacuum-pan, having an outlet, $a$, in the bottom, provided with a slide-valve, $a'$, by means of which the contents of the vacuum-pan are discharged into the upper end of the vacuum-chamber B. Near the upper end of the vacuum-chamber is a perforated diaphragm, C, upon which the material discharged from the vacuum-pan falls. Immediately above the diaphragm the pipe D is inserted through the side wall of the vacuum-chamber. This pipe may be used as an injection-pipe for the purpose of delivering material from the vacuum-pan when the vacuum-pan is not arranged immediately over the vacuum-chamber, as shown; or, if desired, it may be connected with an air-pump and be used as an exhaust-pipe. Immediately beneath the diaphragm is an exhaust-pipe, E, for withdrawing air from the chamber beneath the diaphragm. Near the base of the chamber is a branch pipe, F, one branch of which may be permanently connected with a hot-air generator, while the other branch can be used to inject cold air. It will be seen that the branches of this pipe are provided with stop-cocks $f^1\ f^2$, by opening or closing which the pipe F can be made use of for either of the purposes indicated. The bottom of the vacuum-chamber G is attached by means of the hinge $g$, so as to swing downward in opening. When closed it fits hermetically, and is secured in position by means of the set-screw $g'$, operating upon the hinge $g$, and the set-screw $h$, operating upon the clamp $h'$, which engages the edge of the bottom opposite the hinge. Additional clamps may be applied, if necessary, to secure the bottom in place. In operating my apparatus the sugar-mass is discharged from the vacuum-pan upon the diaphragm C, from which it falls through the perforations in the diaphragm in the form of jets or spray. A partial vacuum is maintained in the chamber by means of the exhaust-pipe E, and by this means the material operated upon while it is falling from the diaphragm to the bottom of the chamber is rapidly deprived of its moisture, and is made to acquire the condition of a granular mass, substantially like what is known as coffee-sugar, the sirup present being adherent to the sugar-crystals. The air may be exhausted from the space above the diaphragm by means of the pipe D, if desired. By means of the pipe F a current of hot air or a current of cold air, or currents of both hot and cold air, may be introduced at the base of the chamber, and made to flow upward and out of the exhaust-pipe E, so that the falling sugar-spray will be brought into direct contact with the air so introduced, if it be desired to adopt either of these alternative modes of conducting the drying operation.

When the vacuum-pan is arranged immediately over the vacuum-chamber, as shown, the sugar-liquor may be boiled down until it contains a very small percentage of water, so that in falling a distance of, say, thirty feet in the vacuum-chamber, it will be converted, by evaporation, into a granular mass resembling coffee-sugar.

The heat of the sugar-mass, as it comes from the vacuum-pan, will usually be sufficient to induce the requisite evaporation in the vacuum-chamber. In the alternative mode of operation, which has been described, additional heat may be administered by injecting hot air, and it will be seen that the temperature of the chamber is completely under control, by reason of the facilities afforded for the introduction of either hot or cold air.

I claim as my invention—

1. In an apparatus for refining sugar, the combination of a vacuum-pan with a vacuum-chamber, which is provided near the top with a perforated diaphragm, substantially as shown and described.

2. The combination, in a vacuum-chamber, of a perforated diaphragm placed near the top of the chamber, and an exhaust pipe or pipes, with an injection-pipe near the base of the chamber, for the purpose of introducing and establishing within the vacuum-chamber an upward current of heated air, for acting upon the sugar-spray discharged through the diaphragm, substantially as described.

3. The combination of a vacuum-chamber, substantially such as described, with a branch pipe situated near the base of the chamber, for the purpose of regulating the temperature of the chamber by injecting therein currents of air of variable temperatures.

F. O. MATTHIESSEN.

Witnesses:
J. H. CUBBERLY,
M. J. O'MARA.